United States Patent
Hartl et al.

(10) Patent No.: US 7,059,841 B2
(45) Date of Patent: Jun. 13, 2006

(54) STRUCTURE OF AN OIL-FREE COMPRESSOR ON A VEHICLE

(75) Inventors: Michael Hartl, Unterhaching (DE); Frank Meyer, Stockach-Wahlwies (DE)

(73) Assignee: Knorr-Bremse System Für Schienenfahrzeuge GmbH, Munich (DE)

( * ) Notice: Subject to any disclaimer, the term of this patent is extended or adjusted under 35 U.S.C. 154(b) by 519 days.

(21) Appl. No.: 10/432,928

(22) PCT Filed: Oct. 23, 2001

(86) PCT No.: PCT/EP01/12234

§ 371 (c)(1), (2), (4) Date: May 28, 2003

(87) PCT Pub. No.: WO02/44003

PCT Pub. Date: Jun. 6, 2002

(65) Prior Publication Data

US 2004/0028538 A1 Feb. 12, 2004

(30) Foreign Application Priority Data

Nov. 28, 2000 (DE) ................................. 100 58 923

(51) Int. Cl.
 *F04B 39/00* (2006.01)
 *F04B 17/00* (2006.01)
 *B61C 3/00* (2006.01)
 *B61C 1/00* (2006.01)

(52) U.S. Cl. ...................... 417/572; 417/360; 417/363; 417/437; 105/35; 105/36; 105/38

(58) Field of Classification Search .................. 417/572, 417/360, 363, 372, 437; 105/35, 36, 38
See application file for complete search history.

(56) References Cited

U.S. PATENT DOCUMENTS

| | | | | |
|---|---|---|---|---|
| 1,632,624 A | * | 6/1927 | Rogivue | .................... 165/44 |
| 3,359,752 A | * | 12/1967 | Westling et al. | ............... 62/239 |
| 3,918,850 A | | 11/1975 | Bridigum | |
| 4,696,626 A | | 9/1987 | Hata et al. | |
| 4,784,585 A | | 11/1988 | Hata et al. | |
| 6,167,956 B1 | * | 1/2001 | Bostedo et al. | ............. 165/284 |
| 6,364,632 B1 | * | 4/2002 | Cromm et al. | ............... 417/372 |

FOREIGN PATENT DOCUMENTS

| | | |
|---|---|---|
| DE | 44 29 098 A1 | 2/1996 |
| DE | 195 24 511 C2 | 5/2000 |
| DE | 199 08 308 A1 * | 8/2000 |
| WO | WO 00/38967 | 7/2000 |

* cited by examiner

*Primary Examiner*—Timothy P. Solak
(74) *Attorney, Agent, or Firm*—Barnes & Thornburg LLP

(57) ABSTRACT

An arrangement of an oil-free compressor apparatus on a rail vehicle for supplying compressed air to pneumatic units assigned to the rail vehicle. The arrangement includes an oil-free compressor and a cooler unit connected with the compressor. The arrangement also includes a rail vehicle having a floor with at least one opening. The compressor is fastened on at least one side to the vehicle floor such that a main axis of rotation of the compressor is arranged essentially vertical with respect to the vehicle floor. The cooler unit interacts with the at least one opening that is configured to take in cooling air to cool the compressor.

11 Claims, 2 Drawing Sheets

STRUCTURE OF AN OIL-FREE COMPRESSOR ON A VEHICLE

BACKGROUND AND SUMMARY OF THE INVENTION

The present invention relates to an arrangement of an oil-free compressor on a vehicle, particularly on a rail vehicle, for supplying compressed air to various pneumatic units assigned to the vehicle.

Normally, a pneumatic system is provided for a rail vehicle, by which the brakes of the rail vehicle, as essential pneumatic units, are operated. For supplying the compressed air, a compressor is used which is usually arranged on the outside of the rail vehicle and in the area of the vehicle floor along the length in a horizontally hanging or standing manner. The compressor consists of a driving unit, which generates a rotating movement and is normally constructed as an electric motor, and of a compressor unit, which essentially consists of several pot-type cylinders for interior pistons, which are arranged on a housing for a crankshaft. The crankshaft is driven by the driving unit converting its rotating movement by one connecting rod into a linear movement for each assigned piston for compressing taken-in air. In addition to this compressor unit constructed as a piston compressor, screw-type compressors are also generally known which are also included within the scope of the present invention. Furthermore, compressor units of this type may have a one-stage or multi-stage construction with at least one low-pressure stage and one high-pressure stage.

The compressors used in the vehicle field are normally subjected to a long continuous operation or to a frequent switching-on and switching-off, which, as a result of friction, leads to a high heat development. Therefore, in the past, compressors that were predominantly used in the vehicle field ensured a sufficient cooling effect on the basis of oil lubrication. However, oil lubrication carries the risk that the lubricating oil, situated in the housing of the compressor unit, in the case of the piston compressor, would penetrates through the piston-cylinder pairing into the pneumatic system, which may result in a fouling by oil of pneumatically operated brake units on the vehicle. Furthermore, the condensate, which occurs during the required air drying of the pneumatic system, because of its oil content, has to be collected for environmental protection reasons in heatable containers and has to be drained and disposed of at regular intervals. This leads to increased maintenance and disposal expenditures as well as to a high oil consumption. Added to the above are difficulties with emulsion formations in the oil circuit of these oil-lubricated compressor units which frequently occur in the case of a low switch-on duration in the winter operation.

Recently, dry-running compressors have therefore been increasingly used. A dry-running compressor operates in its compressor unit without a lubricating oil situated in the housing, that is, oil-free. Instead, in the case of a piston compressor, the lubrication on the piston travel path is replaced by a particularly low-friction dynamic sealing arrangement. All rotating components are normally disposed in roller bearings. The encapsulated roller bearings are provided with a temperature-stable long-lived grease filling. In the valve area, slidably guided components are largely avoided. Because of these measures, an oil lubrication will not be required in the compressor unit. The risk of a foiling by oil of the generated compressed air can therefore be excluded. As a result of the elimination of an oil circuit, the oil-free compressor can, in addition, have a relatively light construction.

Because of the light-construction trend, which is increasing in the vehicle field, light carrier structures are increasingly used also for frame constructions, which carrier structures, however, frequently have a number of unfavorable natural frequencies, which are close to the rotational speed of the compressor of the pneumatic system which is arranged thereon. It therefore presents considerable problems to sufficiently observe the required specifications concerning permissible structure-born noise levels.

As an aspect of the present invention is related to the arrangement of an oil-free compressor on the vehicle such that the structure-borne noise level generated by the operation of the compressor is minimal.

The present invention is an arrangement of an oil-free compressor apparatus on a rail vehicle for supplying compressed air to pneumatic units assigned to the rail vehicle. The arrangement includes an oil-free compressor and a cooler unit connected with the compressor. The arrangement also includes a rail vehicle having a floor with at least one opening to the outside. The compressor is fastened on at least one side to the vehicle floor and is arranged essentially vertically with respect to the vehicle floor. The cooler unit interacts with the at least one opening that is configured to take in cooling air to cool the compressor.

Having the compressor arranged essentially vertical with respect to the vehicle floor results in a particularly low-vibration arrangement of the compressor on the vehicle. Various tests have shown that an essentially vertical axis of rotation of the compressor with respect to the vehicle floor, that is, an axis arranged in the range of from approximately 0° to 10° with respect to a vertical line, no longer generates any noticeable vibration levels on the vehicle floor. This phenomenon can be explained in that no forces and torques act in the direction of the axis of rotation of the compressor. However, these forces do act to a significant extent vertically or perpendicular to the axis of rotation and thus parallel with respect to the vehicle floor. Forces and torques acting parallel to the vehicle floor again generate no noticeable vibration levels therein, because the vehicle floor has a rigid behavior with respect to such an alternating thrust stress. An axis of rotation of the compressor which is vertical with respect to the vehicle floor can be implemented only by means of an oil-free compressor because, in the case of an oil-lubricated compressor, a horizontal arrangement is necessary for constructional reasons in order to achieve a sufficient lubrication and, to this extent, a sufficient stability. When a piston compressor is used, the oil-free compressor, according to the present invention, can be connected with the vehicle floor at such a level at which neither inertia forces and torques, nor gas forces act vertically with respect to the vehicle floor. Thus, for example, in the case of built-in engines or built-in motor units, vibrations originating from the compressor can be prevented from being felt at the driver's seat.

The compressor of the present invention is preferably arranged standing on the vehicle floor in the interior of the vehicle. Adjacent to the vehicle floor, the compressor has a cooler unit on the side facing the floor. There is at least one opening in the vehicle floor leading to the outside that takes in air for cooling the compressor. By this arrangement in the interior of the vehicle, little floor surface of the vehicle is needed, which permits a considerable saving of space with respect to the limited floor surface. Furthermore, the compressor is thereby housed in a protected manner, in which case sufficient cooling is simultaneously supplied through the opening and the adjacent cooler unit. The cooler unit is arranged in the air flow of a propeller, which is driven by the rotational axis of the compressor. That provides a cooling of the compressed air generated by the compressor before this compressed air is supplied to the pneumatic system. Simultaneously, the compressor itself is cooled by the air flow over its surface.

To further this cooling effect, the air flow can be additionally intensified for the cooling of the compressor by the suction effect of a discharge device arranged above the compressor, so that the air flows, in a chimney-type manner, along the compressor for the cooling.

The fastening of the compressor on the vehicle floor preferably takes place by using elastic bearing elements. As a result, an additional vibration decoupling is achieved between the vehicle floor and the compressor. A wire cable spring element or a rubber element, for example, are suitable for a use as the elastic bearing element. The elastic bearing elements may be arranged, on the one hand, between the housing of the compressor itself and the vehicle floor. On the other hand, it is conceivable to arrange the elastic bearing elements between the side facing the cooler unit of the compressor and the vehicle floor. In addition to the elastic bearing elements assigned to the vehicle floor, additional fastening elements may be provided which are placed laterally between the compressor and the vehicle wall. Instead of the vehicle wall, at least one vertical fastening carrier can be used for the laterally supporting fastening of the compressor. The fastening elements used here are preferably also constructed as elastic bearing elements.

In order to be able to carry out the maintenance work required at the appropriate cycles comfortably from a side of the standing compressor without demounting the entire compressor, components of the compressors, such as the air filters, compressor housing lids and terminal box for the electrical connection of the driving unit, are located such that they are laterally easily accessible.

As described above, the compressor includes a driving unit as well as a compressor unit constructed in the manner of a piston compressor or of a screw-type compressor. The rotational axis of the driving unit preferably extends parallel or coaxial with respect to the rotational axis of the compressor unit in order to form the main axis of rotation of the compressor in this manner.

The invention will be better understood and appreciated from the following detailed descriptions and with reference to the accompanying drawings.

DETAILED DESCRIPTION OF THE PREFERRED EMBODIMENTS

Figure 1:
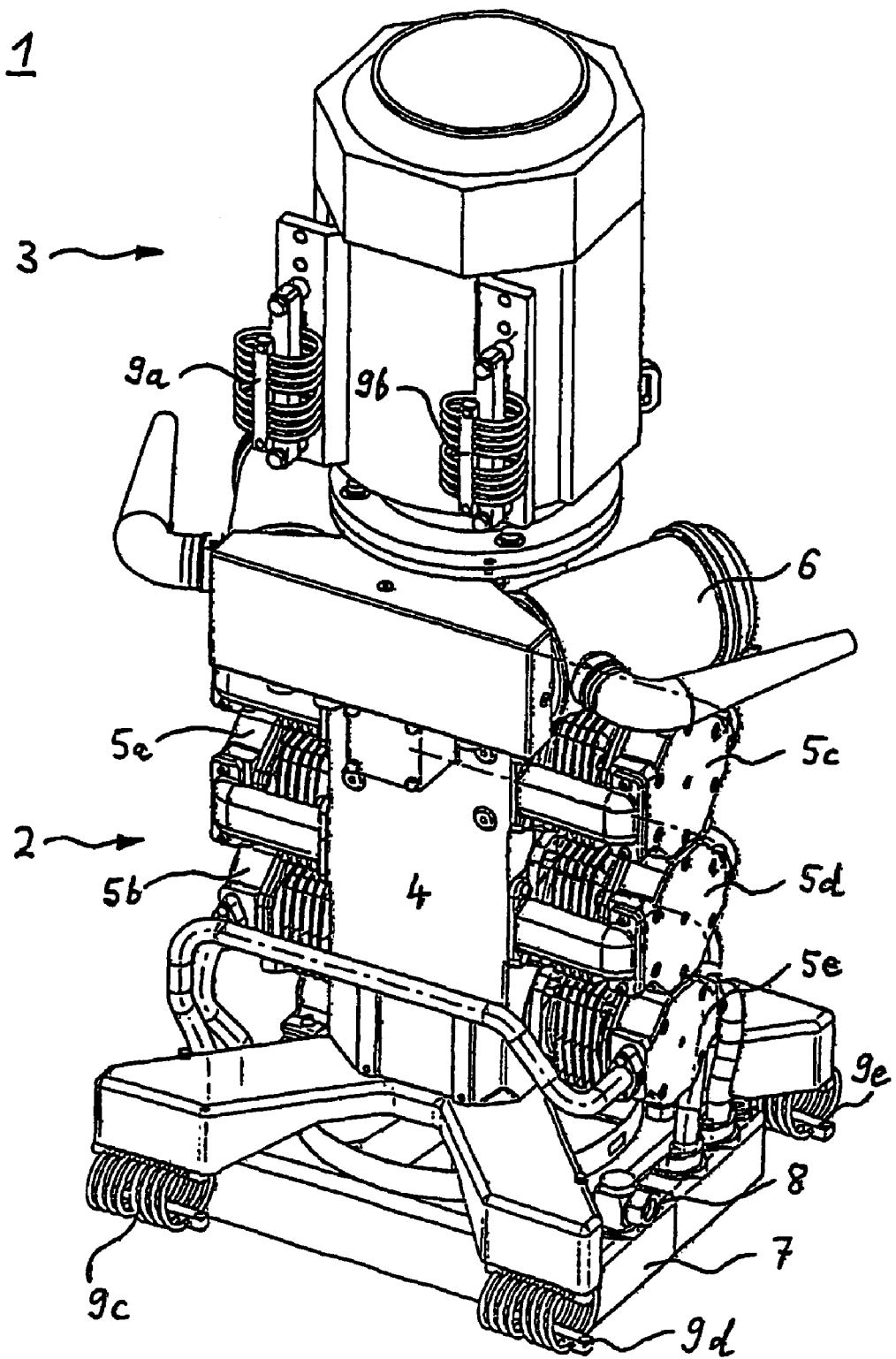
FIG. 1 is a perspective outside view of an oil-free compressor that includes a multi-stage piston compressor in an installed position, according to the principles of the present invention.

The oil-free compressor 1 according to FIG. 1 includes a compressor unit 2 with a coaxially flanged-on driving unit 3. The driving unit 3 is constructed as an electric motor and is detachably fastened to a housing 4 of the compressor unit 2 by a screwed connection (not shown). The driving unit 3 causes rotational movement of a crankshaft (not shown) arranged in the housing 4, which rotational movement is converted to a stroke movement for pistons 5 (not shown) which are housed inside pot-shaped cylinders 5a to 5e fastened on the housing 4 for generating compressed air. By the piston 5 movement, air is taken in from the atmosphere by an inlet-side air filter 6 and is compressed. The thus generated compressed air passes through a cooler unit 7 having a propeller (not shown) and the compressed air will then be available to the pneumatic system of a vehicle by connection 8. In this embodiment, the compressor unit 2 is constructed as a multi-stage piston compressor with a low-pressure stage and a high-pressure stage. Cylinders 5a, 5c, 5d are assigned to the low-pressure stage and cylinders 5b and 5e are assigned to the high-pressure stage. The cylinders 5a to 5e are arranged in an opposed manner on the housing 4 of the compressor unit 2 such that the pistons 5 (not shown) move in essentially a common plane. For fastening the compressor 1, having compressor unit 2 with the flanged-on driving unit 3, to a vehicle, a total of approximately six elastic bearing elements may be provided. Bearing elements 9a to 9e are shown in FIG. 1.

Figure 2:
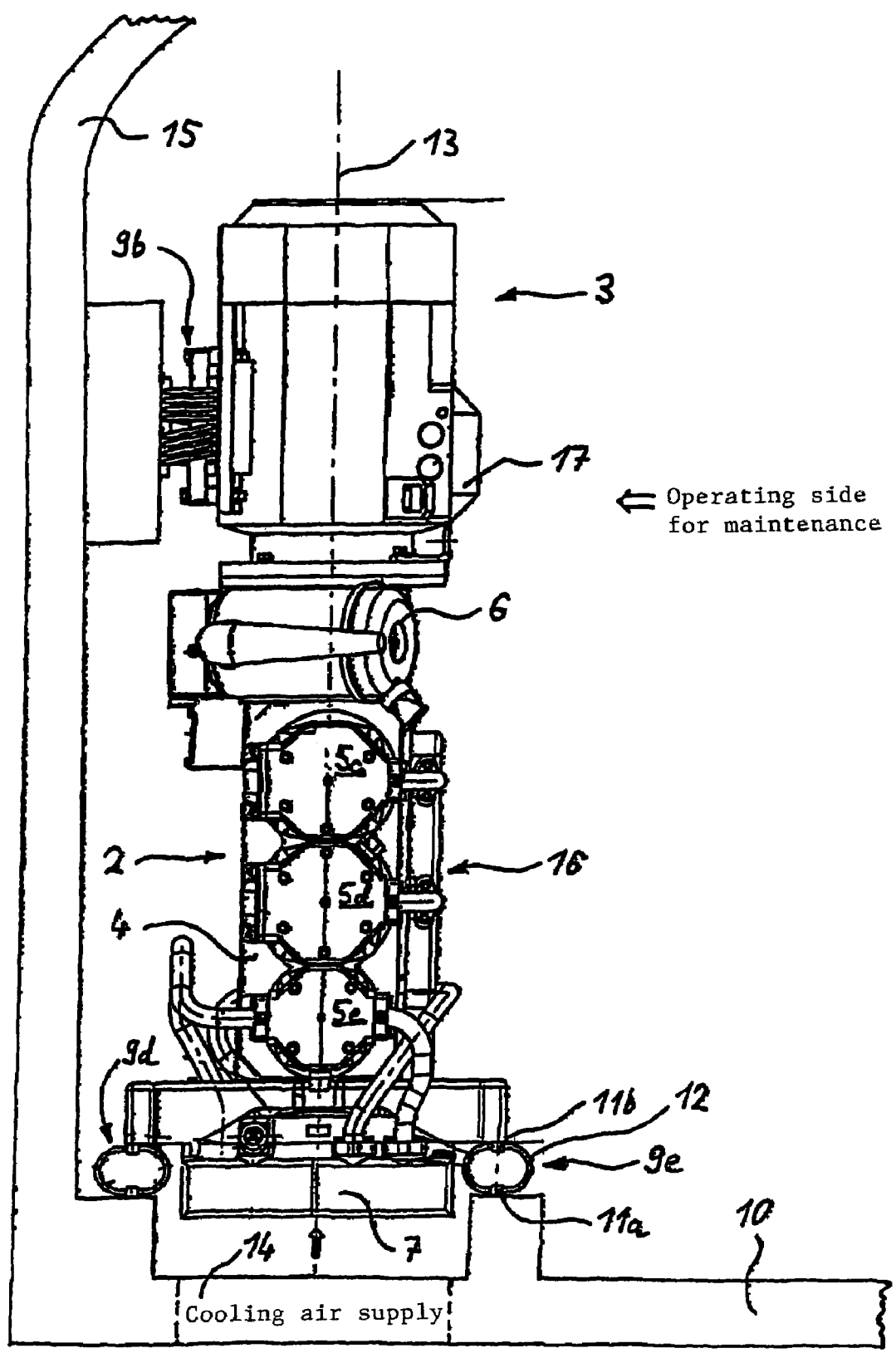
FIG. 2 is a lateral view of the compressor according to FIG. 1 in an installed arrangement in a rail vehicle.

As shown in FIG. 2, fastening of the compressor 1 takes place in a standing manner on a vehicle floor 10, so that main axis of rotation 13 of the compressor 1 is arranged essentially vertical with respect to the vehicle floor 10. Bearing elements 9d, 9e may include two fastening parts 11a and 11b. One fastening part 11a is assigned or fastened to the vehicle floor 10, whereas the oppositely arranged fastening part 11b is assigned or fastened on a side of the compressor having the cooler unit 7 by means of a screwed connection. A wire cable spring 12 may be arranged between the two fastening parts 11a and 11b and may include one or more windings extending in the shape of a helical line. As a result, it is possible to connect the compressor 1, having the compressor unit 2 and the driving unit 3, additionally in a vibration-damping manner with the vehicle floor 10. The fastening of the compressor 1 to the vehicle floor 10 may include using a fastening carrier (not shown) between the compressor 1 and the vehicle floor 10. So that the compressor unit 2 itself generates as few vibrations as possible, its pistons 5 (not shown) operate in an opposed manner, in which case a dynamic balancing takes place with respect to the moved masses. A sufficient cooling air supply for the cooler unit 7 is taken in by opening 14 in the vehicle floor 10, such opening 14 leading to the outside.

In addition to the elastic bearing elements 9d, 9e assigned to the vehicle floor 10, additional bearing elements 9a, 9b may be provided and arranged laterally between a compressor 1 and the vehicle wall 15. The fastening of the compressor 1 to the vehicle walls may include having at least one vertical fastening carrier therebetween (not shown). The compressor 1 is constructed such that its maintained components are laterally easily accessible, for instance from a maintenance operating side, in order to be able to carry out, in the case of the standing arrangement inside the vehicle, required maintenance work from the operating side without a complete demounting of the compressor 1. Maintained components of this type may include housing lid 16 of the compressor unit 2, air filter 6 and a terminal box 17 by which an electrical connection (not shown) of the driving unit 3 takes place.

With respect to construction or arrangement, the compressor of the present invention is not limited to the above preferred embodiments described above. For instance, the compressor 1 may also be constructed as a screw-type compressor. It is also possible to accommodate the compressor 1 at least partially outside the vehicle if the essentially vertical alignment of the main axis of rotation 13 is retained with respect to the vehicle floor 10.

Although the present disclosure has been described and illustrated in detail, it is to be clearly understood that this is done by way of illustration and example only and is not to be taken by way of limitation. The spirit and scope of the present disclosure are to be limited only by the terms of the appended claims.

We claim:

1. An arrangement of an oil-free compressor apparatus on a rail vehicle for supplying compressed air to pneumatic units assigned to the rail vehicle, the arrangement comprising:
    an oil-free compressor;
    a cooler unit connected with the compressor;
    a rail vehicle having a floor with at least one opening; and
    wherein the compressor is fastened on at least one side to the vehicle floor such that a main axis of rotation of the compressor is arranged essentially vertical with respect to the vehicle floor, and the cooler unit interacts with the at least one opening that is configured to take in cooling air to cool the compressor.

2. The arrangement according to claim 1, wherein the compressor is arranged in a standing manner on the vehicle floor in the interior of the vehicle.

3. The arrangement according to claim 1 wherein the cooling air from the cooler unit flows in a chimney-type manner along the compressor as a result of a suction effect of a discharge device arranged above the compressor.

4. The arrangement according to claim 1, wherein the fastening of the at least one side of the compressor to the vehicle floor includes using at least one elastic bearing elements.

5. The arrangement according to claim 4, wherein the at least one elastic bearing elements is arranged between a housing of a compressor unit of the compressor and the vehicle floor.

6. The arrangement according to claim 4, wherein the at least one elastic bearing elements is arranged between the cooler unit and the vehicle floor.

7. The arrangement of claim 4,
    wherein in addition to at least one elastic bearing elements (9c to 9e) element assigned to the vehicle floor, at least one additional fastening element is provided and arranged laterally between the compressor and one of a vehicle wall and at least one vertical fastening carrier.

8. The arrangement according to claim 1,
    wherein the compressor includes laterally accessible maintenance components to carry out required maintenance work from a side of the compressor without a demounting of the compressor.

9. The arrangement according to claim 1,
    wherein the compressor includes a driving unit, and a compressor unit constructed as one of a piston compressor and a screw-type compressor, the axis of rotation of the driving unit extending coaxially with respect to an axis of rotation of the compressor unit in order to form a main axis of rotation of the compressor.

10. The arrangement according to claim 9, wherein, when the compressor unit is constructed as a piston compressor, including at least two cylinders arranged in an opposed manner on a housing of a compressor unit such that pistons situated in the cylinders move in essentially a common plane.

11. The arrangement according to claim 1,
    wherein the fastening of the compressor to the vehicle floor includes having a fastening carrier arranged in-between the compressor and the vehicle floor.

* * * * *